United States Patent
Machledt

[11] Patent Number: 6,006,944
[45] Date of Patent: Dec. 28, 1999

[54] BATTERY STORAGE VAULT

[76] Inventor: Charles G. Machledt, 6306 Winding Brook Dr., New Port Richey, Fla. 34655

[21] Appl. No.: 08/916,950
[22] Filed: Aug. 25, 1997
[51] Int. Cl.$^6$ .................................................. B65D 88/76
[52] U.S. Cl. .................... 220/567.1; 220/484; 52/169.6; 137/493.8
[58] Field of Search ............................... 52/169.6, 169.1, 52/20, 21; 137/493.8; 220/567.1, 484

[56] References Cited

U.S. PATENT DOCUMENTS

| | | | |
|---|---|---|---|
| 1,471,855 | 10/1923 | Mather | 137/493.8 |
| 1,918,807 | 7/1933 | Glab | 137/493.8 |
| 3,390,225 | 6/1968 | Couch et al. . | |
| 3,394,833 | 7/1968 | Forni et al. | 52/169.6 |
| 3,420,943 | 1/1969 | Short . | |
| 3,587,908 | 6/1971 | Nickel | 220/484 |
| 3,738,070 | 6/1973 | Yarbrough | 52/169 |
| 3,938,284 | 2/1976 | Broadbent et al. | 52/20 |
| 4,005,253 | 1/1977 | Walter | 220/484 |
| 4,266,568 | 5/1981 | Kuykendall | 137/493.8 |
| 4,453,359 | 6/1984 | Robinson | 52/389 |
| 4,709,120 | 11/1987 | Pearson . | |
| 4,760,863 | 8/1988 | Broer | 137/493.8 |
| 4,885,880 | 12/1989 | Sudrabin et al. | 52/169.6 |
| 4,949,626 | 8/1990 | Townsend et al. . | |
| 5,048,560 | 9/1991 | Jannotta et al. | 137/493.8 |
| 5,315,794 | 5/1994 | Pearson | 52/20 X |
| 5,495,695 | 3/1996 | Elliott, Jr. | 52/169.6 X |

Primary Examiner—Stephen M. Hepperle
Assistant Examiner—John Bastianelli
Attorney, Agent, or Firm—Terrence L. Siemens

[57] ABSTRACT

A vault for storing batteries underground, having glass fiber reinforced concrete body including a floor and vertical walls, and an insulated fiberglass top closure, and a method of storing batteries. Two conduits disposed in generally concentric fashion communicate between the interior of the vault and the external atmosphere. One conduit has a connector for connecting to a supply of pressurized nitrogen gas. The other conduit branches into two secondary conduits, each having a unidirectional check valve opening when a pressure differential between the interior of the vault is established relative to the external atmosphere. One check valve admits air to the vault and the other check valve allows air to escape to the external atmosphere. The vault includes an external support structure for supporting a davit in an operable position for lifting batteries from the vault. The method of storing the batteries includes burying a water tight vault in the ground, venting the vault, and periodically purging air from the vault under pressure.

6 Claims, 3 Drawing Sheets

BATTERY STORAGE VAULT

BACKGROUND OF THE INVENTION

1. Field of the Invention

The present invention relates to vaults and more particularly to subterranean vaults. The present invention provides lightweight, water-tight construction in a vault and venting and purging features. All of the novel qualities extend life of batteries being stored within the novel vault.

2. Description of the Prior Art

Electrical equipment is frequently stored in enclosures such as cabinets or vaults so that the equipment is located proximate premises served by the equipment, while enabling the equipment to remain substantially inaccessible to the public. In particular, telephone utility companies store batteries for operating the telephone system. Cabinets and vaults are useful in protecting batteries against animals and human vandals and thieves, but are prone to deleterious influences shortening battery life.

The useful life of batteries is reduced by exposure to elevated temperatures and to water. Battery manufacturers supplying batteries typically specify that the environment of the battery average no higher than 77° F. over time and not to exceed 92° F. at any time. Therefore, it is desirable to limit temperatures within and to deny infiltration of water into any enclosure housing batteries. Water may infiltrate by seepage in the liquid state and also by circulation of air laden with humidity into the enclosure. Water vapor will condense when temperatures cool, and will come to rest on battery surfaces, ceiling surfaces above the batteries, and on battery racks, with eventual drippage onto the batteries.

Operation of acid using batteries typically releases hydrogen into the air due to electrolysis of water from the acid. Hydrogen is notoriously combustible, and must be vented to mitigate hazards of fire and explosions. Therefore, it is not feasible to fully seal the enclosure to eliminate infiltration by water. Simultaneously, the enclosure must limit its internal temperature.

Underground vaults for protecting electrical equipment has been proposed in the prior art. Underground vaults are shown in U.S. Pat. Nos. 3,390,225, issued to Robert O. Couch et al. on Jun. 25, 1968, 3,420,943, issued to Herbert D. Short on Jan. 7, 1969, and 4,709,120, issued to Dean C. Pearson on Nov. 24, 1987. The vault of Pearson comprises inner and outer concentrically disposed chambers, the inner chamber being wooden and the outer chamber being metallic. Pearson's vault is ventilated by a duct having a controllable damper. By contrast, the vault of the present invention comprises a single chamber formed from fiberglass reinforced concrete, and has a tightly controlled venting and air purging system.

Short provides a concrete vault having a raised floor or stand for supporting a transformer. This vault is cooled by a wind powered ventilating fan mounted atop an exhaust stack. By contrast, the concrete vault of the present invention is impervious to water and is effectively closed to constant communication with the atmosphere by its venting and air purging system.

Couch sets forth an inexpensive construction wherein a metallic pipe or the like is arranged vertically, with one end resting on or embedded within a concrete pad. This invention lacks the continuous concrete construction and venting and air purging system of the present invention.

U.S. Pat. No. 4,949,626, issued to Douglas W. Townsend et al. on Aug. 21, 1990, describes a sump assembly designed to expel both water and radon gas from a building. The sump comprises a pit covered by a hood. The hood encloses both a pump for ejecting accumulated water and a fan for forcibly venting radon gas. This device is far from air and water tight, as is the present invention. The device of Townsend et al. further lacks the fiberglass reinforced housing and air purging system of the present invention.

None of the above inventions and patents, taken either singly or in combination, is seen to describe the instant invention as claimed.

SUMMARY OF THE INVENTION

The present invention provides a vault intended for underground storage of lead acid and other batteries which must be maintained at limited temperatures and which evolve hydrogen gas during operation. The underground location exploits cool temperatures which prevail even during the summer. These temperatures maintain the batteries at temperatures which will extend the useful life of the batteries. The novel vault is water tight, so that rainfall, normal hydrostatic pressure, and similar influences will not cause water to enter the vault.

Air pressure is controlled by a valve scheme employing unidirectional check valves and two conduits. One conduit is dedicated to flushing the interior of the vault with nitrogen gas, or purging. When nitrogen gas is introduced into the vault, air occupying the vault is displaced and vented to the exterior. This operation is performed periodically to purge both hydrogen and oxygen from the interior of the vault for fire and explosion control purposes and also to mitigate humidity.

A second conduit communicates between the interior of the vault and the external atmosphere. The second conduit branches into two conduits, each having a unidirectional check valve which will open responsive to a pressure difference of one half pound per square inch. Each check valve opens in a direction opposite that of the other check valve. The exhaust check valve vents air from the vault when pressure develops due to generation of hydrogen gas and temperature increase. The inlet check valve relieves a partial vacuum condition which may develop within the vault as temperatures decrease. It should be noted that a temperature fluctuation of 15° F. may cause a rise or drop in pressure of one pound per square foot if not relieved. A desiccant is located within the inlet conduit to control increase in humidity.

The vault body comprises a glass fiber reinforced concrete receptacle having a floor and vertical walls, and an insulated fiberglass cover which is removed to afford access to the interior of the vault body. The cover is not buried and thus exposed to a cooling effect as is the concrete receptacle, so that insulation is required to protect the interior of the vault from temperature increase from above. The gas conduits are disposed one inside the other, so that only one penetration for passing gas conduits through a wall of the vault is required. An electrical sump pump is incorporated to expel liquids which may possibly accumulate at the floor of the receptacle. Optionally, the vault includes an external storage compartment for storing davits which may be required to install and remove batteries from the vault.

Accordingly, it is a principal object of the invention to provide a water tight vault for storing batteries which vault is suitable for burial in the ground.

It is another object of the invention to exploit moderate temperatures prevailing underground to limit temperatures to which stored batteries will be exposed.

It is a further object of the invention to enable the gaseous atmosphere of the interior of the vault to vent automatically to the external atmosphere.

Still another object of the invention is to enable automatic venting to relieve reduced pressure which may develop within the vault.

An additional object of the invention is to provide a valve and conduit for flushing the interior of the vault with a pressurized gas.

It is again an object of the invention to remove humidity from air automatically entering the vault.

Yet another object of the invention is to limit penetrations through the receptacle to one penetration.

A still further object of the invention is to store a davit proximate the vault for lifting batteries.

A further object of the invention is to expel liquids which may accumulate in the receptacle of the vault.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
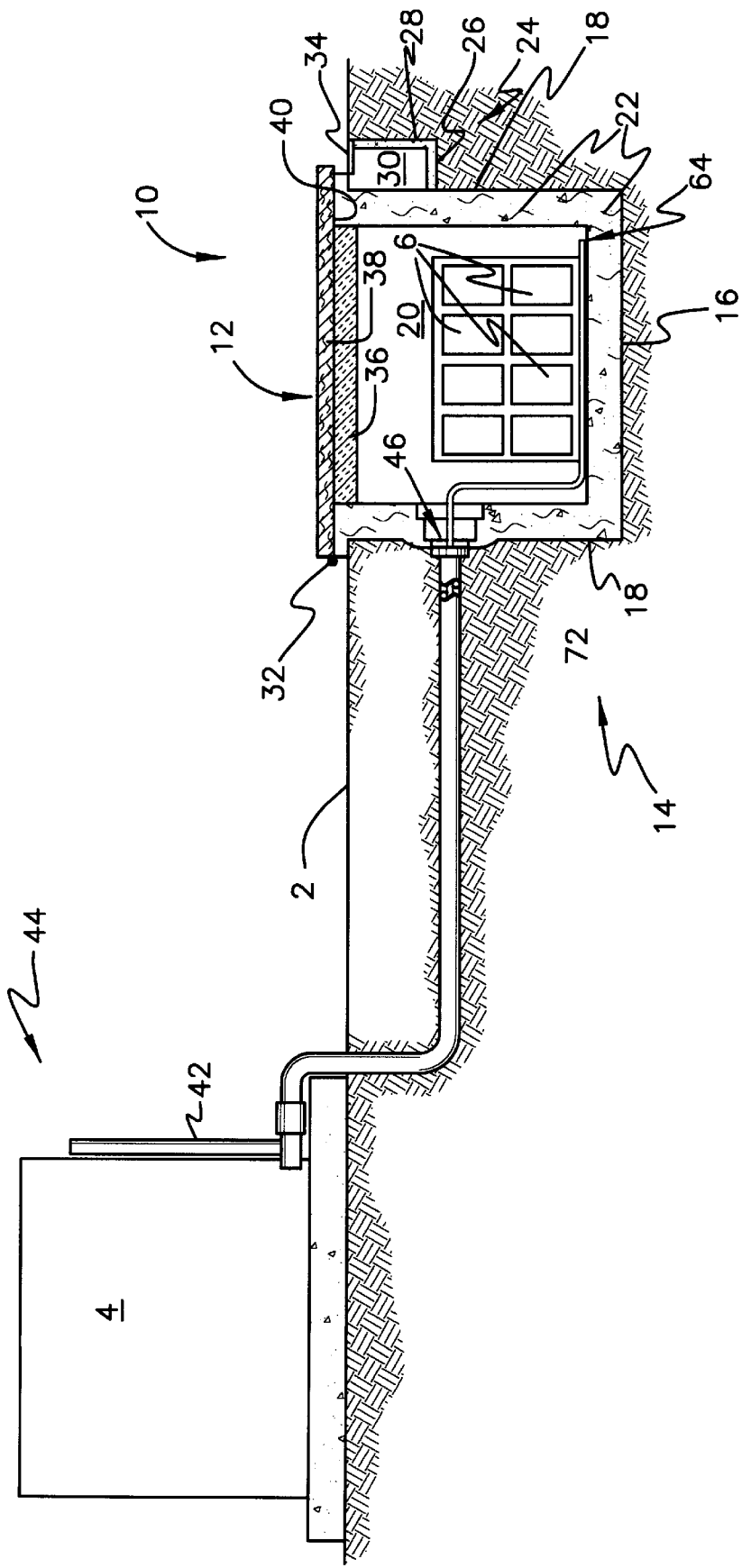
FIG. 1 is an environmental, mostly cross sectional view of the invention.

Turning now to FIG. 1 of the drawings, novel vault 10 is shown buried in the ground 2 such that only access closure 12 would be visible to an observer. Vault 10 is buried in close proximity to a cabinet 4 storing electrical and electronic equipment (not shown) served by batteries 6 which are stored within vault 10. Vault 10 comprises a receptacle 14 for storing batteries 6 and a ventilation system which will be further described hereinafter.

Receptacle 14 comprises a floor 16 and vertical walls 18 which collectively enclose a storage space 20 for storing batteries 6 and a battery rack or similar storage device (not shown). Receptacle 14 is fabricated from concrete reinforced by glass fibers 22 dispersed throughout the concrete mix in random order. Fibers 22 are fabricated from a glass composition impervious to alkaline influences. The concrete mix is extremely strong due to reinforcement by glass fibers 22, and is fabricated from constituent materials selected to impart impermeability to water.

A supporting structure 24 is formed upon the exterior of receptacle 14, for supporting a davit (not shown) in an operable position for lifting batteries 6. The davit is stored on a truck operated by service personnel, and is temporarily supported proximate vault 10 when batteries 6 must be installed in and removed from vault 10. Supporting structure 24 comprises a floor 26 and a lateral wall 28 enclosing an opening 30 accessible from above. The mast of the davit is inserted into opening 30 when closure 12 is moved to the open position.

Closure 12 is hinged to receptacle 14 by a hinge 32. Closure 12 is dimensioned and configured to overhang receptacle 14 when closed, thereby obstructing access to supporting structure 24 and to a cap 34 provided to seal opening 30 against dirt. Closure 12 comprises a structural member fabricated from fiberglass having insulation 36 depending therefrom, which insulation insulates space 20 when closure 12 is in the closed position illustrated in FIG. 1. Insulation 36 is disposed upon lower surface 38 of the structural member forming closure 12. Insulation 36 terminates within lateral edges 40 of the structural member of closure 12 so that it will project into space 20 without interfering with walls 18. Lower surface 38 therefore includes a perimetric zone unencumbered by insulation 36, this zone being defined as that portion of surface 38 extending between insulation 36 and edges 40. Closure 12 thereby contacts and seals walls 18 when closure 12 is placed on and closes receptacle 14.

Battery vaults must be ventilated to abate concentration of potentially explosive hydrogen and to avoid deleterious effects of pressure on battery operation and life. Vault 10 has a ventilation system designed to relieve both pressure greater than and less than that of the external atmosphere. A first conduit 42 penetrates wall 18 of receptacle 14 and is sufficiently long to extend above vault 10 to extend to the external atmosphere when vault 10 is partially buried in ground 2. Distal end 44 of conduit 42 is shown mounted on a side of electrical cabinet 4 for convenience. This situation will frequently prevail since cabinet 4 will necessarily be located in close proximity to vault 10 for ready connection of batteries 6 contained in vault 10 to the electrical equipment contained within cabinet 4 and served by batteries 6. Proximal end 46 of conduit 42 opens into space 20 of vault 10.

Figure 2:
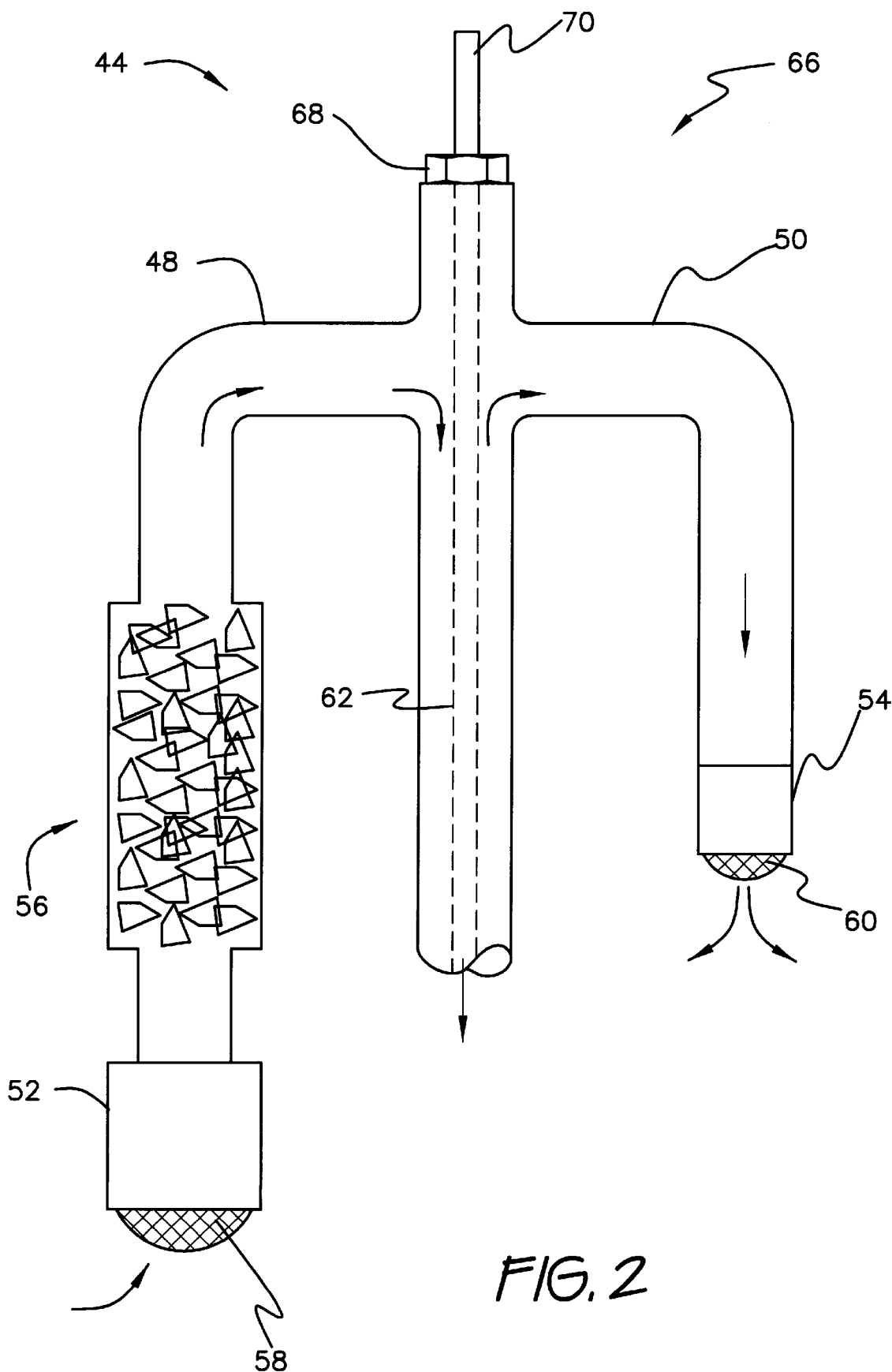
FIG. 2 is a front elevational view of a component projecting upwardly from the novel vault.

FIG. 2 shows details of distal end 44 of conduit 42. Conduit 42 branches into two legs 48, 50. Each leg 48 or 50 terminates in a unidirectional check valve 52 or 54 (respectively) communicating between the interior of conduit 42 and the external atmosphere. Check valve 52 opens to the external atmosphere responsive to a pressure prevailing within vault 10 below that of the external atmosphere by a predetermined value. Pressure within space 20 may occur spontaneously due to cooling effects imposed from the environment. For example, cool rainfall saturating ground 2 may eventually cool receptacle 14 and, in turn, space 20 and its contents. A typical preferred predetermined value for causing check valve 52 to open is one half pound per square inch. Air from the external atmosphere will be drawn into receptacle 14 when check valve 52 opens. Conduit 48 includes a chamber containing a desiccant material 56 for removing humidity from air entering receptacle 14. An air filter 58 prevents entry of insects, airborne contaminants, and small objects into conduit 48 when valve 52 opens.

Pressure increase may occur due to temperature changes as space 20 and objects contained within space 20 increase in temperature, due to generation of hydrogen by electrolysis of water solvent of batteries 6, or by intentional introduction of gasses into space 20. Check valve 54 relieves this pressure by opening responsive to pressures prevailing within vault 10 exceeding that of the external atmosphere by a predetermined value. A preferred predetermined value for relieving excess pressure within vault 10 is also one half pound per square inch. A screen 60 may be provided to prevent insects and other pests from interfering with operation of valve 54.

From time to time, it will be desired to purge the atmosphere of space 20 with a pressurized gas (not shown), such as nitrogen, or any other generally inert gas. Conduit 42 is modified to accommodate such an operation as follows. A second conduit 62 is located within conduit 42. At its proximal end 64 (see FIG. 1), conduit 62 as well as conduit 42 is permanently open to space 20. At its distal end 66, conduit 62 passes to the exterior of conduit 42. A manual shutoff valve 68 opens and closes conduit 62. Conduit 62 terminates in a connector 70, which may constitute a pneumatic fitting, for connection to a supply of pressurized gas. The atmosphere of space 20 of receptacle 14 may be flushed when the supply of pressurized gas is connected to connector 70 of conduit 62 and shutoff valve 68 is opened.

Conduits 42 and 62 are disposed in surrounding relation, whereby only one penetration through receptacle 14 is required for both conduit 42 and conduit 62 to penetrate receptacle 14. This penetration occurs at an opening 72 (see FIG. 1) formed in wall 18. Opening 72 is sealed by a suitable packing gland (not shown) or in any other suitable way. For example, a short section of pipe or other conduit (not shown) may be embedded within wall 18 at the time of fabrication, so that conduit 42 need only be connected at the stub of the pipe. Of course, either conduit 42 or 62 may be selected to surround the other conduit 62 or 42.

Respective proximal ends 46 and 64 of conduits 42 and 62 are open to space 20, so that gasses may flow according to the schemes described above when check valves 52 and 54 open automatically and when shutoff valve 68 is intentionally opened. Direction of air and gas flow is indicated by arrows for clarity of understanding, it being understood that air within conduit 42 cannot flow simultaneously in all directions indicated by arrows since only one check valve 52 or 54 will be open at any one moment in time.

Figure 3:
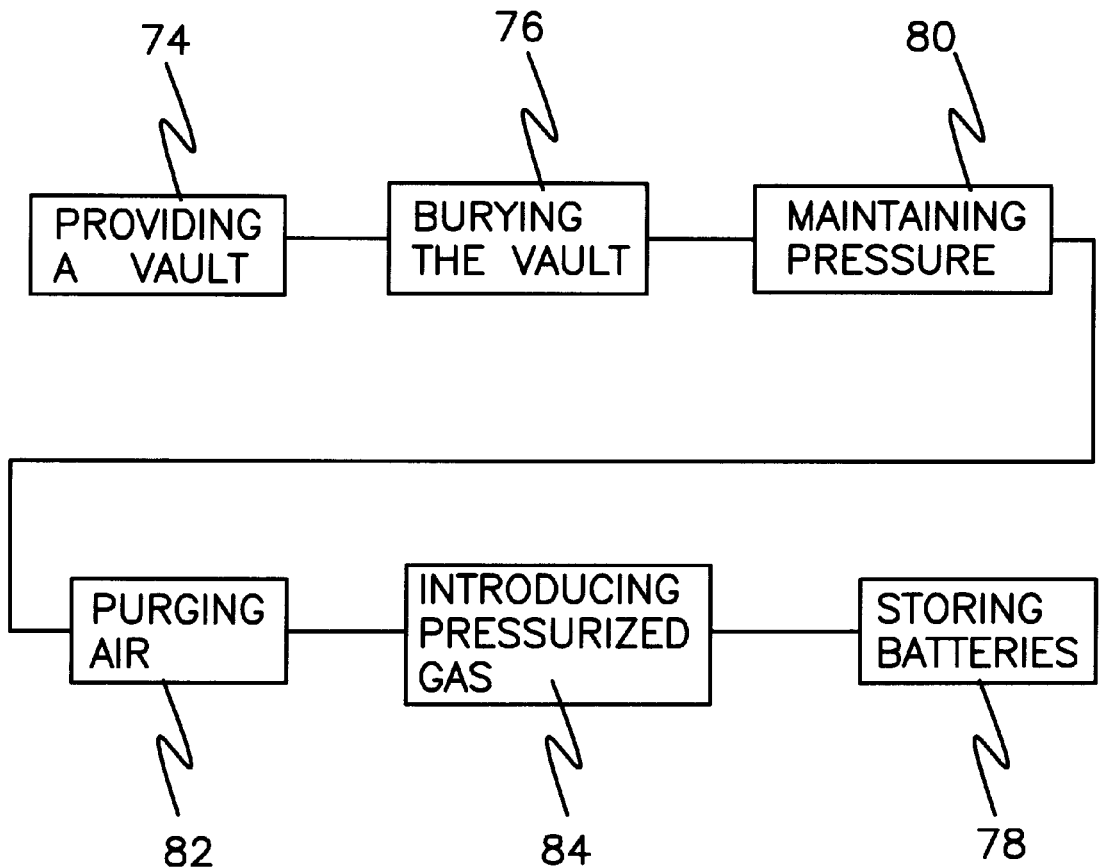
FIG. 3 is a block diagram of steps of practicing a method according to the invention, and is read from left to right.

Significant benefits of the invention accrue due to a method of storing batteries 6 within vault 10 underground. As summarized in FIG. 3, steps of a novel method of storing and prolonging the useful life of batteries 6 are as follows. A first step 74 is that of providing a vault. The vault may be glass fiber reinforced concrete vault 10 or any vault, housing, or enclosure (not shown) fabricated from aluminum, fiberglass, or any other suitable material. Preferably, the vault is water tight or alternatively provided with apparatus for evacuating water. Next, in step 76, the vault is substantially buried in the ground. For purposes of this discussion, "substantially" signifies that the majority of the vault is buried, but need not be entirely buried. In a subsequent step 78, batteries are stored in the vault.

To extend the life of batteries and to promote fire safety, a step 80 of maintaining internal atmospheric pressure within the vault at a level within a predetermined value of external atmospheric pressure is practiced.

As an alternative to step 80 or as a supplementary measure, a step 82 of periodically purging air from the vault is practiced. Although step 82 may be practiced by providing a fan (not shown) which may be periodically or continuously operated, or other apparatus for forcing circulation of air or other gas into the vault, a step 84 of introducing pressurized gas into the vault assures that the gas replacing purged air be of inert nature and free from humidity.

The present invention is susceptible to variations and modifications which may be introduced by those of skill in the art. For example, vault 10 may include a battery rack or equivalent support, lifting eyes and a lock for securing closure 12. A sump pump for expelling water from receptacle 14 may be provided. None of these items are shown. Check valves 52 and 54 may be supplanted by a single valve controlled by one or more pressure transducers, so that venting is achieved according to the novel scheme even though the actual apparatus controlling venting is modified. Conversely, manual shutoff valve 68 may be eliminated in favor of an automatically operating valve (not shown) which may respond to pressure, electrical signals, or other controlling influences.

It is to be understood that the present invention is not limited to the embodiments described above, but encompasses any and all embodiments within the scope of the following claims.

I claim:

1. A vault suitable for underground burial, for storing batteries, said vault comprising a water impervious receptacle formed from fiber reinforced concrete with randomly oriented fibers distributed throughout said concrete, wherein said fibers are impervious to alkaline influences, said receptacle having a floor and vertical walls enclosing a storage space for storing the batteries, and a water impervious closure for affording access to said storage space, said closure having temperature insulation disposed to insulate said storage space when said closure closes said receptacle, and said receptacle being unencumbered by insulation.

2. A vault suitable for underground burial, for storing batteries, said vault comprising:

a water impervious receptacle formed from fiber glass reinforced concrete, said receptacle having a floor and vertical walls enclosing a storage space for storing said batteries, and a water impervious closure for affording access to said storage space, said closure having temperature insulation disposed to insulate said storage space when said closure closes said receptacle, said closure comprising a structural member fabricated from fiberglass and having a lower surface and lateral edges, said insulation disposed upon said lower surface of said structural member and terminating within said lateral edges of said closure, said lower surface closure having a perimetric zone unencumbered by insulation, for contacting and sealing said walls of said receptacle when said closure is placed on and closes said receptacle.

3. The vault according to claim 1, further comprising a support structure disposed upon the exterior of said vault, for supporting a davit in an operable position for lifting batteries, said support structure comprising a lateral wall enclosing an opening accessible from above and a floor, whereby a davit operated by service personnel may be temporarily supported proximate said vault when the batteries are being installed in and removed from said vault.

4. The vault according to claim 1, further comprising a first conduit penetrating through said receptacle and having sufficient length to extend above said vault to the external atmosphere when said vault is partially buried in the ground, said first conduit having a first unidirectional check valve communicating between said conduit and the external atmosphere, said first unidirectional check valve opening to the external atmosphere responsive to a pressure prevailing within said vault exceeding the pressure of the external atmosphere by a predetermined value, a second unidirectional check valve communicating between said conduit and the external atmosphere, said second unidirectional check valve opening to the external atmosphere responsive to a pressure prevailing within said vault below that of the external atmosphere by at least a predetermined value, and a second conduit penetrating through said receptacle and having sufficient length to extend above said vault to the external atmosphere when said vault is partially buried in the ground, said second conduit having a shutoff valve and a connector for connection to a supply of pressurized gas, whereby the atmosphere of said receptacle may be flushed when the supply of pressurized gas is connected to said second conduit and said shutoff valve is opened.

5. A vault suitable for underground burial, for storing batteries, said vault comprising a water impervious receptacle formed from fiber glass reinforced concrete, said receptacle having a floor and vertical walls enclosing a storage space for storing batteries, a water impervious closure for affording access to said storage space, a first conduit penetrating through said receptacle and having sufficient length to extend above said vault to the external atmosphere when said vault is partially buried in the ground, said first conduit having a first unidirectional check valve communicating between said conduit and the external atmosphere, said first unidirectional check valve opening to the external atmosphere responsive to a pressure prevailing within said vault exceeding the pressure of the external atmosphere by a predetermined value, and a second unidirectional check valve communicating between said conduit and the external atmosphere, said second unidirectional check valve opening to the external atmosphere responsive to a pressure prevailing within said vault below that of the external atmosphere by at least a predetermined value; and a second conduit penetrating through said receptacle and having sufficient length to extend above said vault to the external atmosphere when said vault is partially buried in the ground, said second conduit having a shutoff valve and a connector for connection to a supply of pressurized gas, whereby the atmosphere of said receptacle may be flushed when the supply of pressurized gas is connected to said second conduit and said shutoff valve is opened, wherein said first conduit and said second conduit are disposed in surrounding relation, whereby only one penetration through said receptacle is required for both said first conduit and said second conduit to penetrate said receptacle.

6. A ventilation system for venting the interior of a vault for storing batteries, comprising a first conduit for penetrating to the interior of the vault and communicating to the external atmosphere, said first conduit having a first unidirectional check valve communicating between said first conduit and the external atmosphere, said first unidirectional check valve opening to the external atmosphere responsive to a pressure prevailing within the conduit exceeding the pressure of the external atmosphere by a predetermined value, and a second unidirectional check valve communicating between said first conduit and the external atmosphere, said second unidirectional check valve opening to the external atmosphere responsive to a pressure prevailing within said first conduit below that of the external atmosphere by at least a predetermined value, and a second conduit for penetrating into the vault, said second conduit having a shutoff valve and a connector for connection to a supply of pressurized gas, whereby the atmosphere of the vault may be flushed when the supply of pressurized gas is connected to said second conduit and said shutoff valve is opened wherein, said first conduit and said second conduit are disposed in surrounding relation, whereby only one penetration through the vault is required for both said first conduit and said second conduit to penetrate the vault.

* * * * *